(12) United States Patent
Walth

(10) Patent No.: US 8,727,736 B2
(45) Date of Patent: May 20, 2014

(54) MULTIPLE ELECTRIC MOTORS DRIVING A SINGLE COMPRESSOR STRING

(75) Inventor: Shawn Michael Walth, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 967 days.

(21) Appl. No.: 12/326,173

(22) Filed: Dec. 2, 2008

(65) Prior Publication Data
US 2010/0135825 A1 Jun. 3, 2010

(51) Int. Cl.
*F02C 6/00* (2006.01)
*F04B 35/04* (2006.01)

(52) U.S. Cl.
USPC .......................... 417/44.1; 417/410.1; 62/611

(58) Field of Classification Search
USPC ................................ 417/44.1, 410.1; 62/611
See application file for complete search history.

(56) References Cited

U.S. PATENT DOCUMENTS

| | | | |
|---|---|---|---|
| 4,566,885 A | 1/1986 | Haak | |
| 6,658,891 B2 | 12/2003 | Reijnen et al. | |
| 2003/0052485 A1 * | 3/2003 | Poteet et al. | 290/4 R |
| 2004/0090205 A1 * | 5/2004 | Chen et al. | 318/772 |
| 2004/0245869 A1 * | 12/2004 | Dooley | 310/68 C |
| 2005/0188708 A1 * | 9/2005 | Wills et al. | 62/175 |
| 2006/0283206 A1 | 12/2006 | Rasmussen et al. | |

OTHER PUBLICATIONS

Roy Salisbury; Design, Manufacture, and Test Campaign of the World's Largest LNG Refrigeration Compressor Strings; 15'th LNG Conference; Barcelona, Spain; Apr. 24-27, 2007.

* cited by examiner

*Primary Examiner* — Nimeshkumar Patel
*Assistant Examiner* — Jacob R Stern
(74) *Attorney, Agent, or Firm* — Gary M. Machetta

(57) ABSTRACT

Systems and methods of driving a compressor are provided. The compressor can be driven by multiple electric motors, which can be controlled by an adjustable speed drive (ASD) to increase efficiency. A torque controller may also be included.

18 Claims, 3 Drawing Sheets

MULTIPLE ELECTRIC MOTORS DRIVING A SINGLE COMPRESSOR STRING

BACKGROUND

1. Field

The present embodiments generally relate to the subject of drive mechanisms for compressors. More particularly, the present embodiments relate to the use of multiple motor drive systems to drive a single compressor string.

2. Description of the Related Art

Compressors, such as those used in refrigeration applications, for example in the production of liquefied natural gas (LNG), are often driven by a gas turbine, an electric motor, or a combination of both.

Industrial gas turbines used in LNG production may have been originally designed for use in other industries, such as the electrical power industry. These turbines are typically designed with specific outputs. Two designs that are available include (i) designs for the 50 Hz market, which operate at 3000 rpm, and (ii) designs for the 60 Hz market, which operate at 3600 rpm. These requirements are precise and speed variation is severely constrained. Frequency variability is on the order of about ±5%.

The designs of such gas turbines can be very limiting in that any deviation from the operational designs of 3000 rpm for 50 Hz or 3600 rpm for 60 Hz power may result in significant problems for the electrical users. For example, if the turbine and associated compressor are operating at 3100 rpm, but the electrical grid frequency is 50 Hz (3000 rpm), the generated frequency would be 51.7 Hz. Generating electrical power at 51.7 Hz may cause significant problems for users connected to the electrical system. Typically, frequency tolerance for electrical systems is on the order of only ±0.5 Hz.

Such turbines are designed to be most efficient when they are operated at maximum capacity, which can also reduce emissions and fuel consumption. To increase or decrease energy production the fuel flow rate can be varied. Operation of the gas turbine at lower fuel rates will generally reduce its efficiency and increase its emissions.

Starting a power-generating gas turbine is a simple task, because a starter motor is only needed to spin the gas turbine and generator up to speed from its powered-down state. Once at operating speed, the gas turbine provides all needed power and the starter can be disengaged.

Starting a compressor-driven gas turbine is more difficult compared to starting a power-generating gas turbine. The reason for this is that the compression load must also be taken upon the starter motor until the gas turbine is brought up to speed. In the case of LNG production, it is the refrigerant that flows through the compressor throughout the starting process. To overcome this obstacle a larger starter motor is required in compressor-driving gas turbine applications.

Gas turbines operate at different output ratings depending on the ambient temperature. This should be taken into account when such turbines are deployed. For warmer climates the turbine must be sized to overcome the adverse effects a higher temperature has on its ability to power the associated compressor in the hotter months. During cooler months less power may be required, and the turbine may produce excess energy that may not be needed.

The use of a motor to drive compressors has advantages. The motor can vary frequency much more readily than a gas turbine is capable of, which is useful in increasing efficiency and reducing waste energy. A motor can have a smaller footprint in a plant, making it possible to design smaller plants and/or transportable plants, such as those built on an offshore vessel or structure. A motor can draw power from an existing power grid, from a generator, or from other sources of power. A motor can be controlled by an adjustable speed drive ASD, capable of controlling the speed of the motor. An adjustable speed drive can also be referred to as a variable frequency drive VFD, a variable speed drive VSD, variable speed drive system VSDS, adjustable frequency drive AFD, or other variations which are considered inclusive in the use of the term ASD herein.

Another arrangement to drive one or more compressor is that of a motor and gas turbine combined. This arrangement can still have the constraints and problems inherent in utilizing a gas turbine.

A multiple motor assembly may be desirable in certain applications in order to address some of the limitations the aforementioned systems have. Higher torque control can be maintained throughout the drive system. Less waste and waste energy would be produced than in a system comprising gas turbines. Multiple smaller motors linked together can provide the power of a larger motor. Smaller motors can be more industry proven and tested than larger motors. With a multiple electric motor assembly if one motor is not operable the other motors can still supply power and the facility, depending on the embodiment, can still operate at a reduced capacity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
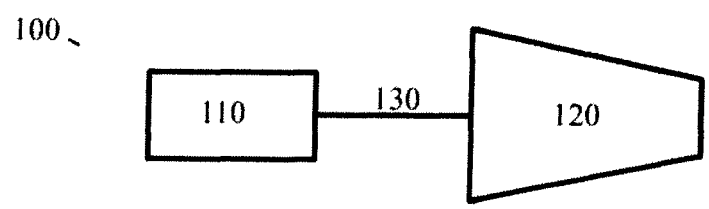
FIG. 1 illustrates a drive system for a compressor including one motor.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

The use of multiple motors to drive the load of a single compressor string which may be made up of multiple compressors coupled to a common compressor string shaft.

One embodiment of the present invention is a compressor drive system including at least two electric motors connected to a drive shaft that is connected to at least one compressor. The system can also have one or more adjustable speed drive controllers that are capable of controlling the electric motors. The adjustable speed drive controller can distribute the load requirements of the compressor between the electric motors.

A torque controller may also be connected to one or more of the electric motors, the torque controller capable of sending control signals to one or more of the adjustable speed drive controllers. The torque controller can control an adjustable speed drive controller for each electric motor and distribute the load requirements of the compressor between the electric motors.

The compressor can be used for hydrocarbon compression service, compression of any other vapor phase material, or as a refrigeration compressor that can provide refrigeration duty in a natural gas liquefaction plant. The drive shaft can have one or more linkages or gearboxes that can transmit rotational energy to the compressor.

An alternate embodiment of the present invention is a method for operating refrigeration compressors for the liquefaction of natural gas by providing two or more electric motors to a common drive shaft and one or more refrigeration compressors also connected to the common drive shaft. The method also has an adjustable speed drive controller capable of distributing the load requirements of the one or more refrigeration compressors between the electric motors. Power is supplied to the one or more refrigeration compressors from the electric motors through the common drive shaft to operate the compressors at a desired throughput level. The adjustable speed drive controller distributes the load requirements of the one or more refrigeration compressors between the electric motors to optimize electrical efficiency.

The method can further include a torque controller connected to at least one of the electric motors and capable of sending control signals to the adjustable speed drive controller. The torque controller can control an adjustable speed drive controller for each electric motor and distribute the load requirements of the one or more refrigeration compressors between the electric motors to optimize electrical efficiency.

The drive shaft can have one or more linkages or gearboxes that can transmit rotational energy to the one or more refrigeration compressors.

An alternate embodiment of the present invention is a process for the compression of a vapor stream that includes providing at least two electric motors connected to at least one drive shaft connected to at least one compressor. A first vapor stream is compressed in the compressor to produce a second vapor stream having higher pressure than the first vapor stream. The drive shaft can comprise one or more linkages or gearboxes that can transmit rotational energy to the compressor.

The process can further include one or more adjustable speed drive controller capable of controlling the electric motors. A torque controller can be connected to the electric motors capable of sending control signals to the adjustable speed drive controller. The adjustable speed drive controller can be capable of distributing the load requirements of the compressor between the electric motors. The torque controller can be capable of controlling an adjustable speed drive controller for each electric motor and distributing the load requirements of the compressor between the electric motors.

Compressors are usually driven by a gas turbine, a motor, or a combination of a gas turbine and motor to meet the compressor load torque requirements. For electric compressor driver applications, the motor capacity is limited to the design capability of motors. To drive compressor loads in excess of the capability of a single electric motor, multiple motors can be coupled to the compressor string shaft.

The use of multiple motors can result in an excess of electrical motor capacity, for example if two 60 MW motors supply a load that only requires 90 MW. The combined 120 MW of the two motors is more than the 90 MW that is needed. One method of addressing this problem is by using adjustable speed drive (ASD) controls to regulate the output of the motors and to balance the loading of the motors.

Adjustable Speed Drive (ASD) describes equipment used to control the speed of machinery. Many industrial processes may operate at different speeds for different products. Where process conditions demand adjustment of flow from a pump, compressor, or fan, varying the speed of the drive may save energy compared with other techniques for flow control. Some of the benefits include smoother operation, ability to adjust the rate of production, ability to compensate for changing process variables and increased torque control.

An adjustable speed drive can often provide smoother operation compared to an alternative fixed speed mode of operation. For example, in a process where fluid is pumped from one vessel to another, the operation can be either an intermittent pumping operation or can be a steady state operation. When fixed speed pumps are used, the pumps can be controlled to start when the level of the liquid in the first vessel reaches some high point and stop when the level has been reduced to a low point. Constantly cycling the pumps on and off results in frequent surges of electrical current to start the motors resulting in electromagnetic and thermal stresses in the motors and power control equipment, the pumps and pipes are subjected to mechanical and hydraulic stresses, and the process is forced to accommodate surges in the flow of fluid through the process. When adjustable speed drives are used, the pumps can operate continuously at a speed that varies based on the duty required. This use of adjustable speed drives allows the outflow to match the average inflow and, therefore, provides a much smoother operation of the process.

A torque controller can used in adjustable speed drives to control the torque (and thus finally the speed) of three-phase AC electric motors. Controlling the torque involves calculating an estimate of the motor's magnetic flux and torque based on the measured voltage and current of the motor. The flux and torque are then compared with their reference values. If either the estimated flux or torque deviates from the reference more than the allowed tolerance, the variable frequency drive can adjust in such a way that the flux and torque will return to within their tolerance bands.

A separate torque controller may also be applied controlling independent ASD and motor drivers. It should be noted that the total number of motors, compressors or adjustable speed drives could be any number greater than one. The use of an ASD may or may not be necessary for the control of the motor load balancing depending on the use of other torque balancing methods.

With reference to the figures, FIG. 1 illustrates a drive system for a compressor including one motor. FIG. 1 is an example of prior art, wherein a compressor and drive system 100 is comprised of compressor 120, motor 110, and drive shaft 130. In this example, only one is used. Motor 110 drives compressor 120. The drive shaft 130 connects the motor 110 to the compressor 120.

Figure 2:
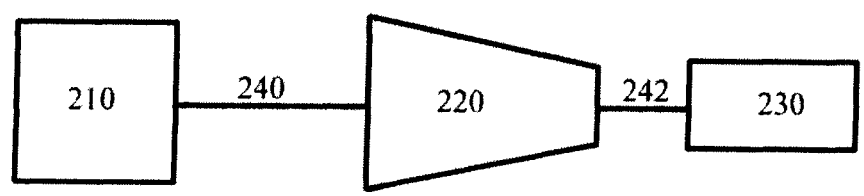
FIG. 2 illustrates a drive system for a compressor including a gas turbine coupled with a motor.

FIG. 2 illustrates a drive system for a compressor including a gas turbine coupled with a motor. FIG. 2 is an example of prior art, wherein a compressor and drive system 200 is comprised of compressor 220, gas turbine 210, motor 230, and drive shaft 240 & 242. Gas turbine 210 and/or motor 230 drives compressor 220 through drive shaft 240 & 242.

Figure 3:
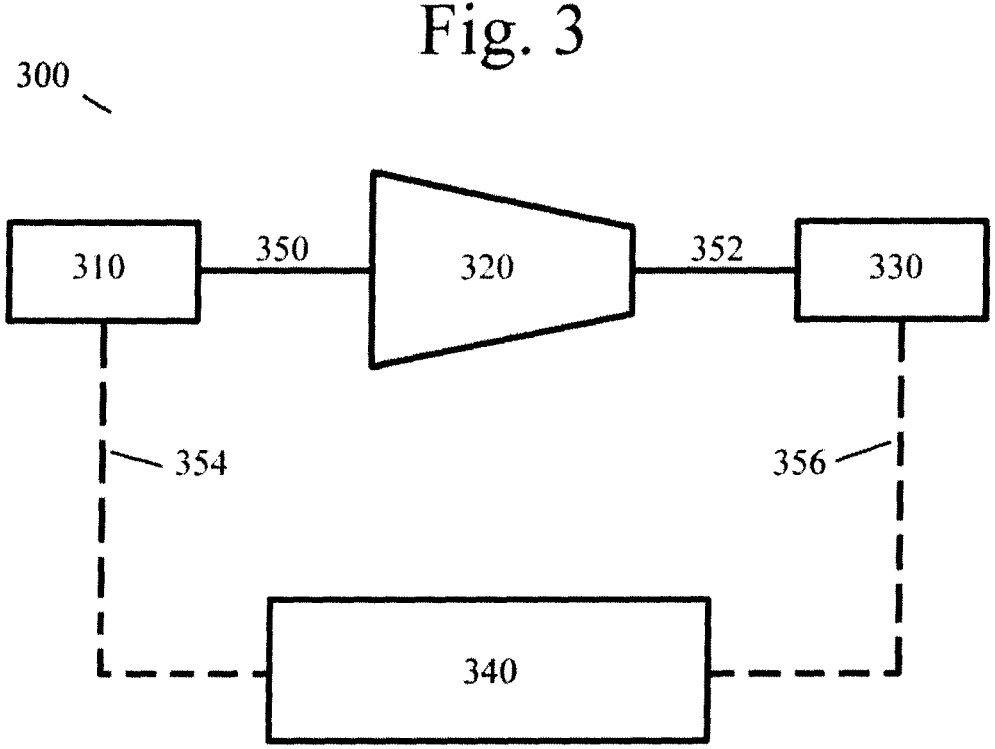
FIG. 3 illustrates an embodiment of the invention for a compressor drive system including multiple motors controlled by an ASD.

FIG. 3 illustrates an embodiment of the invention for a compressor drive system including multiple motors controlled by an ASD. In one embodiment, compressor and drive system 300 includes compressor 320, ASD 340, motors 310 & 330, and drive shaft 350 & 352. It should be noted that the placement of the motors may vary, and that the number of motors may be any number greater than 1. The motors need not be of the same size or rating. The motors can draw power from an existing electrical grid, from electricity generated by turbine generator, or alternate electrical sources. In addition, the compressor 320 can comprise more than a single compressor and can comprise a compressor string that can include multiple stage compression and/or parallel compressors driven off a common drive system.

ASD 340 controls the output of motors 310 & 330 to adjust to the requirements of compressor 320. Drive shaft 350 & 352 connects the motors to the compressor. The load on motors 310 & 330 can be split in any way, such as for example 50/50% or 75/25%. For maximum efficiency the motors may vary the energy supplied to the compressor so that less power is wasted. In one embodiment, the compressor can be used in hydrocarbon transmission and/or processing, such as LNG liquefaction. In one embodiment drive shaft 350 & 352 may be a single drive shaft. In another embodiment linkages or a gearbox may be connected to the one or more drive shaft.

Figure 4:
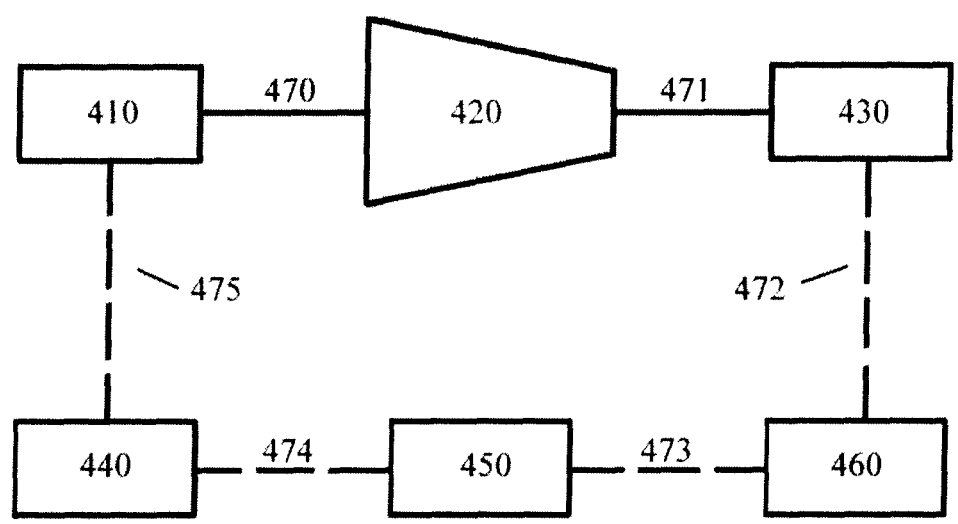
FIG. 4 illustrates an embodiment of the invention for a compressor drive system including multiple motors, each controlled by an ASD, which are in turn controlled by a torque controller.

FIG. 4 illustrates an embodiment of the invention for a compressor drive system including multiple motors, each controlled by an ASD, which are in turn controlled by a torque controller. In one embodiment of the invention, compressor, drive system, and control system 400 includes compressor 420, motors 410 & 430, ASDs 440 & 460, and torque controller 450. The placement of the motors may vary, and that the number of motors may be any number greater than 1. The motors need not be of the same size or rating and may draw power from a grid or from an alternate electrical source.

Torque controller 450 can be used to control ASDs 440 & 460, adding further control over the torque and speed of the drives. The ASDs 440 & 460 can control the motors 410 & 430 and enable output variations based on the system need. Drive shaft 470 & 471 connects the motors 410 & 430 to compressor 420. The load on motors 410 & 430 can be split in any way, such as for example 50/50% or 75/25%. For maximum efficiency the motors may vary the energy supplied to the compressor so that less power is wasted.

In one embodiment drive shaft 470 & 471 may be a single direct shaft. In another embodiment, one or more linkage or gearbox may separate the drive shaft. The one or more linkage or gearbox can connect the one or more compressors to the respective drive shaft.

In one embodiment the compressor can be used in hydrocarbon transmission and/or processing, such as LNG liquefaction. The compressor 420 can comprise more than a single compressor and can comprise a compressor string that can include multiple stage compression and/or parallel compressors driven off a common drive system.

As used herein the term "drive shaft" shall mean one or more connection means of transferring rotational energy between components of a mechanical system. Connected components in a compression service can comprise a "compression string."

As used herein the term "adjustable speed drive" or "ASD" shall mean an instrument or other control mechanism or system capable of controlling the speed of the motor. An adjustable speed drive can also be referred to as a variable frequency drive VFD, a variable speed drive VSD, variable speed drive system VSDS, or adjustable frequency drive AFD, which shall be inclusive in the meaning of an ASD.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, the term should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A compressor drive system comprising:
a gas powered turbine connected to at least one drive shaft;
at least one compressor connected to the at least one drive shaft and fluidly coupled to a natural gas liquefaction plant;
a first electric motor and a second electric motor each connected to the at least one drive shaft;
a first adjustable speed drive controller and a second adjustable speed drive controller coupled to the first and second electric motors, respectively, wherein the first and second adjustable speed drive controllers control the first and second electric motors by varying an input frequency to the first and second electric motors; and
a torque controller coupled to the first and second adjustable speed drive controllers, wherein the torque controller sends control signals to at least one of the first and second adjustable speed drive controllers, and wherein the torque controller controls at least one of the first and second adjustable speed drive controllers and distributes load requirements of the at least one compressor between the first and second electric motors.

2. The system of claim 1, wherein the at least one compressor compresses natural gas prior to liquefying the natural gas in the natural gas liquefaction plant, and wherein the first and second electric motors provide up to about 130% of the mechanical load required by the at least one compressor to compress the natural gas to a pressure sufficient to provide refrigeration duty in the natural gas liquefaction plant.

3. The system of claim 1, wherein the at least one compressor is a refrigeration compressor.

4. The system of claim 3, wherein the refrigeration compressor provides refrigeration duty to the natural gas liquefaction plant.

5. The system of claim 1, wherein the at least one drive shaft comprises one or more linkages or gearboxes that transmit rotational energy to the at least one compressor.

6. The system of claim 1, wherein the first electric motor and the second electric motor produce a combined mechanical load greater than the mechanical load required by the at least one compressor.

7. The system of claim 1, wherein the first electric motor and the second electric motor have a different load rating with respect to one another.

8. The system of claim 1, wherein the first electric motor and the second electric motor vary a mechanical load supplied to the at least one compressor.

9. The system of claim 1, wherein the first and second adjustable speed drive controllers are variable frequency drives.

10. The system of claim 1, wherein the torque controller calculates an estimate of torque and magnetic flux of the first and second electric motors based on a measured voltage and a measured current of the first and second electric motors.

11. The system of claim 10, wherein the torque controller compares the estimated torque and magnetic flux with reference torque and magnetic flux values and a signal is transmitted from the torque controller to the adjustable speed drive controllers when the estimated torque and magnetic flux deviate from the reference values by more than an allowed tolerance.

12. The system of claim 1, wherein the adjustable speed drive controllers each control the first and second electric motors by varying an input frequency and an input voltage to the first and second electric motors.

13. The system of claim 1, wherein the at least one compressor comprises two or more compressors arranged in series, wherein the at least one drive shaft is a common compressor string shaft 25% to 75% of a mechanical load required by the two or more compressors is provided by the first electric motor and the remaining 75% to 25% of the mechanical load required by the two or more compressors is provided by the second electric motor.

14. The system of claim 13, wherein the gas powered turbine provides up to about 100% of the mechanical load required by the at least one compressor to compress the natural gas to a pressure sufficient to provide refrigeration duty in the natural gas liquefaction plant.

15. The system of claim 1, wherein the first and second electric motors are three-phase AC electric motors.

16. A compressor drive system comprising:
a gas powered turbine connected to at least one drive shaft;
a first electric motor and a second electric motor each connected to the at least one drive shaft, wherein the first and second electric motors are three-phase AC electric motors, wherein the drive shaft comprises one or more linkages or gearboxes that transmit rotational energy to at least one compressor of a natural gas liquefaction plant, wherein 25% to 75% of a mechanical load required by the at least one compressor is provided by the first electric motor and the remaining 75% to 25% of the mechanical load required by the at least one compressor is provided by the second electric motor, and wherein the first and second electric motors provide up to about 130% of the mechanical load required by the at least one compressor to compress the natural gas to a pressure sufficient to provide refrigeration duty in the natural gas liquefaction plant;
a first variable frequency drives coupled to the first electric motor and a second variable frequency drive coupled to the second electric motor, wherein the first and second variable frequency drives control the first and second electric motors by varying an input frequency and an input voltage to the electric motors; and
a torque controller coupled to each of the variable frequency drives, wherein the torque controller sends control signals to each of the adjustable speed drive controllers, wherein the torque controller controls each of the adjustable speed drive controllers and distributes load requirements of the compressor between the electric motors, and wherein the torque controller calculates an estimate of torque and magnetic flux of the electric motors based on a measured voltage and a measured current of the electric motors and the torque controller compares the estimated torque and magnetic flux with reference torque and magnetic flux values and a signal is transmitted from the torque controller to the adjustable speed drive controllers when the estimated torque and magnetic flux deviate from the reference values by more than an allowed tolerance.

17. The system of claim 16, wherein the at least one compressor compresses natural gas prior to liquefying the natural gas in the natural gas liquefaction plant.

18. The system of claim 16, wherein the gas-turbine is started by first compressing refrigerant in the compressor with the first and second electric motors until the gas turbine reaches operating speed.

* * * * *